(12) United States Patent
Wang

(10) Patent No.: US 9,016,956 B2
(45) Date of Patent: Apr. 28, 2015

(54) OPTOELECTRONIC TRANSMISSION MODULE

(71) Applicant: Chih-Shou Wang, New Taipei (TW)

(72) Inventor: Chih-Shou Wang, New Taipei (TW)

( * ) Notice: Subject to any disclaimer, the term of this patent is extended or adjusted under 35 U.S.C. 154(b) by 63 days.

(21) Appl. No.: 13/959,459

(22) Filed: Aug. 5, 2013

(65) Prior Publication Data

US 2015/0036983 A1    Feb. 5, 2015

(51) Int. Cl.
*G02B 6/36* (2006.01)
*G02B 6/42* (2006.01)

(52) U.S. Cl.
CPC ..................................... *G02B 6/428* (2013.01)

(58) Field of Classification Search
CPC .. G02B 6/4214; G02B 6/4292; G02B 6/4284; G02B 6/428; G02B 6/43; G02B 6/42; G02B 6/36

USPC .......................... 385/14, 53, 88, 89, 123, 126
See application file for complete search history.

(56) References Cited

U.S. PATENT DOCUMENTS 6,285,808 B1 * 9/2001 Mehlhorn et al. ............... 385/14
7,090,509 B1 * 8/2006 Gilliland et al. ............. 439/76.1

* cited by examiner

*Primary Examiner* — Jennifer Doan
(74) *Attorney, Agent, or Firm* — Muncy, Geissler, Olds & Lowe P.C.

(57) ABSTRACT

An optoelectronic transmission module is applied in an optoelectronic connector for data transmission. In the present invention, one flexible circuit board and two hard circuit boards are in electrical connection, among which the first circuit board is electrically connected with an optoelectronic module for connecting with an optical fiber. With this structure, the second and the third circuit boards can transmit or receive data through the optical fiber of the first circuit board. In this manner, this invention can conduct bidirectional data transmission so as to save significantly the consumption of manufacturing cost of the optoelectronic module.

7 Claims, 9 Drawing Sheets

OPTOELECTRONIC TRANSMISSION MODULE

BACKGROUND OF THE INVENTION

1. Field of the invention

The present invention relates to an optoelectronic transmission module applied in an optoelectronic connector for data transmission, more particularly to an optoelectronic transmission module which can conduct data transmission through a single optoelectronic module.

2. Brief Description of Prior Arts

Due to significant increase of both communication demand and data transmission, the communication mode of using coaxial cable as the transmission medium has been inadequate and thus optical fiber is dominantly used as the transmission medium. Referring to FIG. 1, a conventional optoelectronic connector 10 is shown to have a first circuit board 101 and a second circuit board 102 which respectively have a first optoelectronic module 1011 and a second optoelectronic module 1021. The first optoelectronic module 1011 and the second optoelectronic module 1021 are respectively connected with optical fiber lines (11, 11'), which can be single-core or multi-cores lines. Further, the first optoelectronic module 1011 and the second optoelectronic module 1021 are respectively formed with a first information transmission port 1012 and a second information transmission port 1022. The first circuit board 101 and the second circuit board 102 are assembled within a connector 103. Users can connect the optoelectronic connector 10 between corresponding information transmission equipments to conduct data transmission. As stated above, the first circuit board 101 and the second circuit board 102 of the optoelectronic connector 10 are respectively provided with the first optoelectronic module 1011 and the second optoelectronic module 1021 and have respective optical fiber lines (11, 11') therein. The optoelectronic modules (1011, 1021) and the optical fiber lines (11, 11') are key parts for data transmission and therefore share a dominant proportion of manufacturing cost. Thus, how to reduce the manufacturing cost effectively is one of the issues to be addressed.

SUMMARY OF THE INVENTION

In view of the abovementioned problems, the main object of the present invention is to provide an optoelectronic transmission module, which enables bidirectional data transmission by a single optoelectronic module, and which can lower manufacturing cost effectively.

In order to achieve above objects, the optoelectronic transmission module of the present invention has a first circuit board, a second circuit board and a third circuit board, in which the first circuit board is a flexible circuit board, and the second and the third circuit boards are printed circuit boards; the first circuit board is electrically connected with the second and the third circuit boards in such a manner that the second and the third circuit boards are provided at both ends of the first circuit boards in normal state. Further, the first circuit board has an optoelectronic module which is connected with an optical fiber for information transmission, so that the second and the third circuit boards can transmit or receive data through the optical fiber of the first circuit board. In this manner, this invention can conduct bidirectional data transmission so as to save significantly the consumption of manufacturing cost of the optoelectronic module.

BRIEF DESCRIPTION OF ACCOMPANYING DRAWINGS

The present invention will be better understood by the detailed description of a preferred embodiment with reference to the accompanied drawings, in which.

DETAILED DESCRIPTION OF PREFERRED EMBODIMENTS

Figure 1:
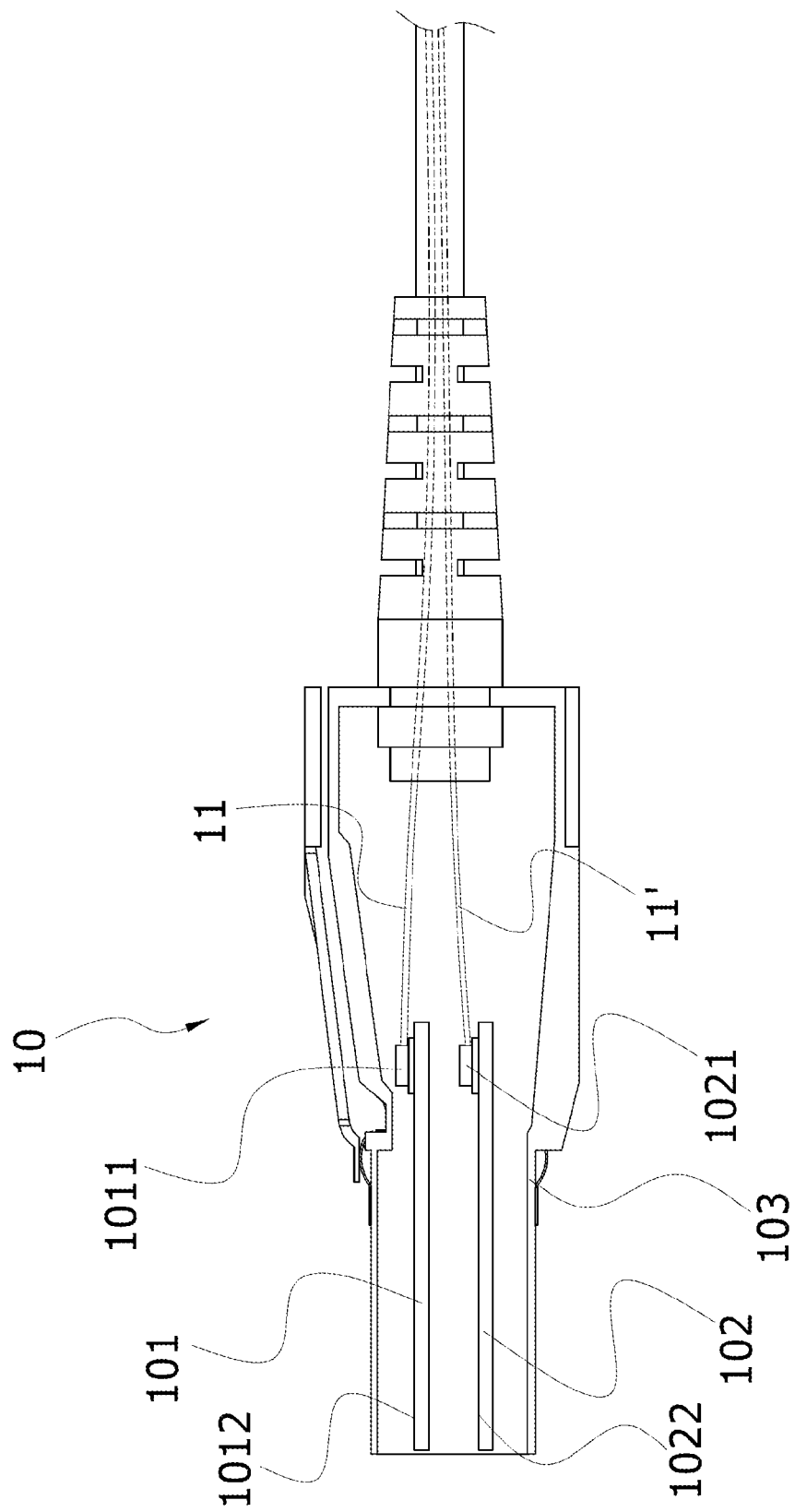
FIG. 1 is a schematic view showing the structure of a conventional optoelectronic connector.
Figure 2:
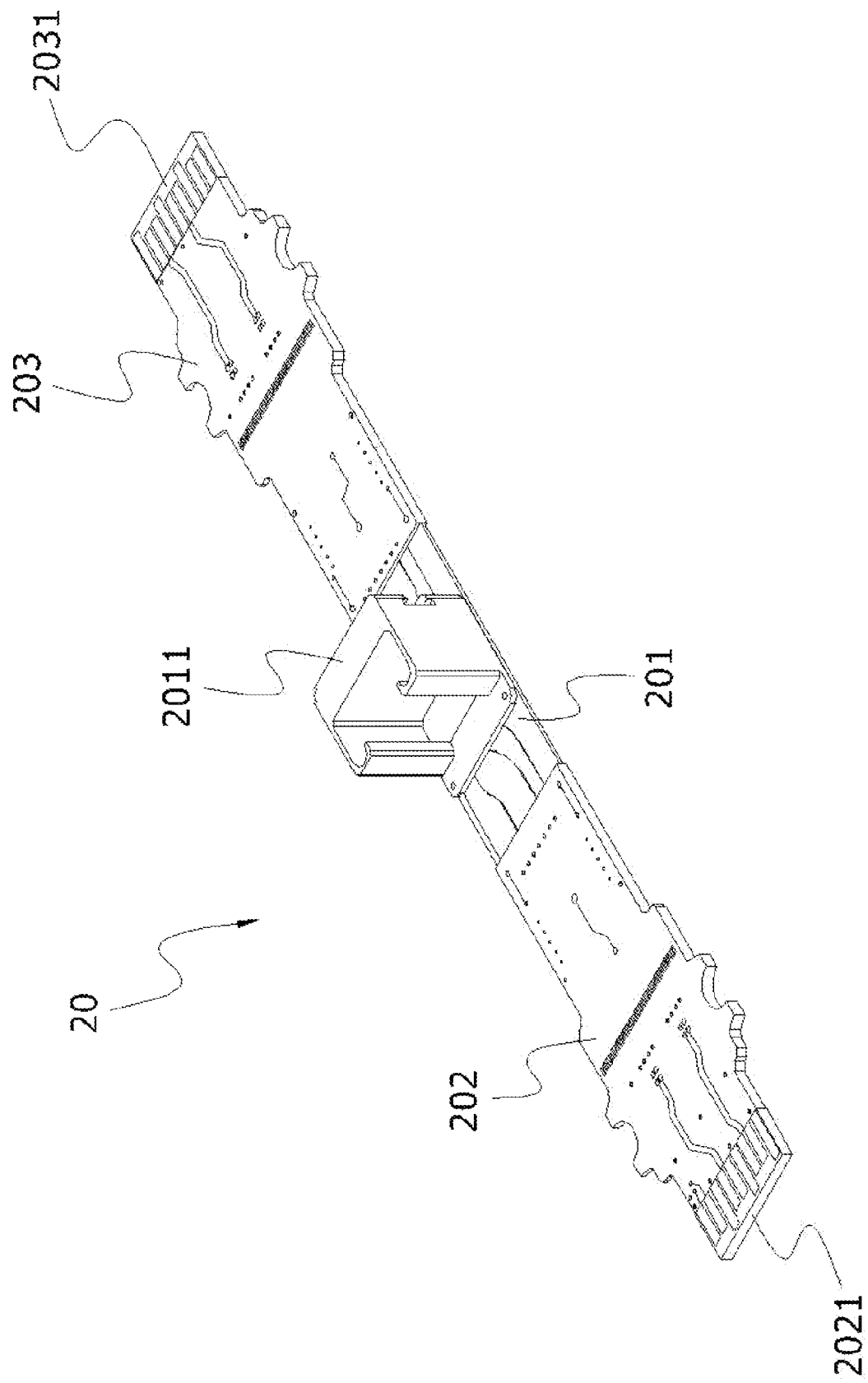
FIG. 2 is a schematic view showing the constitution of the members of the present invention.

Referring to FIG. 2, the optoelectronic transmission module 20 of the present invention is mainly formed by a first circuit board 201, a second circuit board 202 and a third circuit board 203. The first circuit board 201 is a flexible circuit board, while the second and the third circuit board 202, 203 are printed circuit boards. The second and the third circuit board 202, 203 respectively have a first information transmission port 2021 and a second information transmission port 2031 formed at one of the ends thereof. The first circuit board 201 is provided with an optoelectronic module 2011 which is connected with an optical fiber line 21 (not shown). The optical fiber line 21 can be a single-core or a multi-cores line through which the optoelectronic module 2011 can conduct bidirectional data transmission. Furthermore, the second circuit board 202 and the third circuit board 203 are hard type printed circuit boards, while the first circuit board 201 is a flexible type printed circuit board having suitable flexibility. The first circuit board 201, the second and the third circuit boards (202, 203) are electrically connected in such a manner that the second and the third circuit boards (202, 203) are electrically connected to both ends of the first circuit board 201 in normal states. With this structure, the second and the third circuit boards (202, 203) can transmit or receive data through the optical fiber line 21 of the first circuit board 201. Furthermore, the first circuit board, the second and the third circuit boards (201, 202, 203) are formed as integral in normal state, and the second and the third circuit boards (202, 203) are respectively formed on both ends of the first circuit board 201 so as to transmit and receive data through the optical fiber 21 connected with the first circuit board 201.

Figure 3:
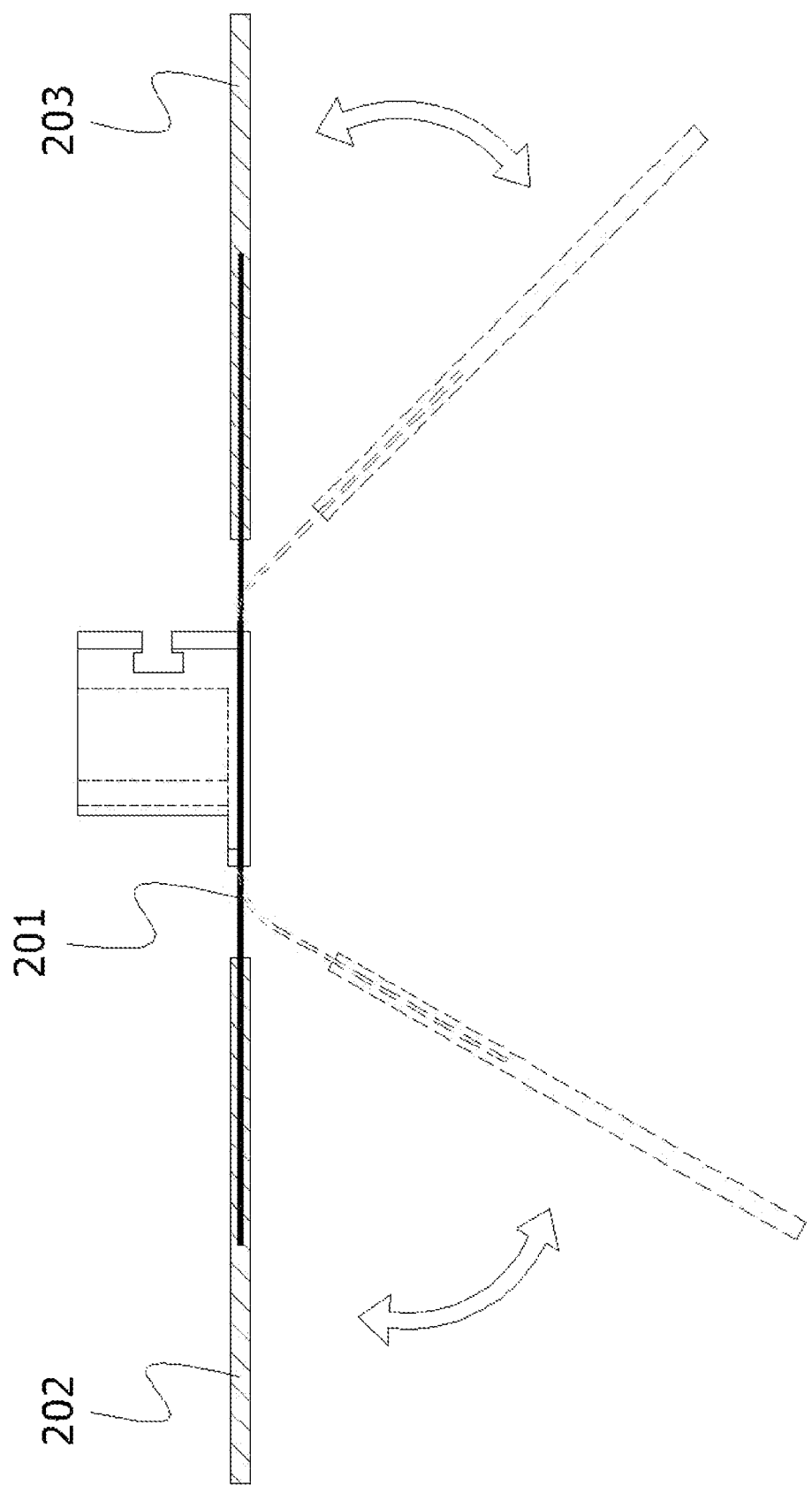
FIG. 3 is a schematic view showing the constitution of the present invention.

Referring to FIG. 3, the second and the third circuit boards (202, 203) are respectively formed on both ends of the first circuit board 201 to form as integral therewith, so as to prevent detachment between the first circuit board 201 and the second as well as the third circuit boards (202, 203). Furthermore, as the first circuit board 201 is a flexible type circuit board, the second and the third circuit boards (202, 203) can be bent appropriately relative to the first circuit board 201.

Figure 4:
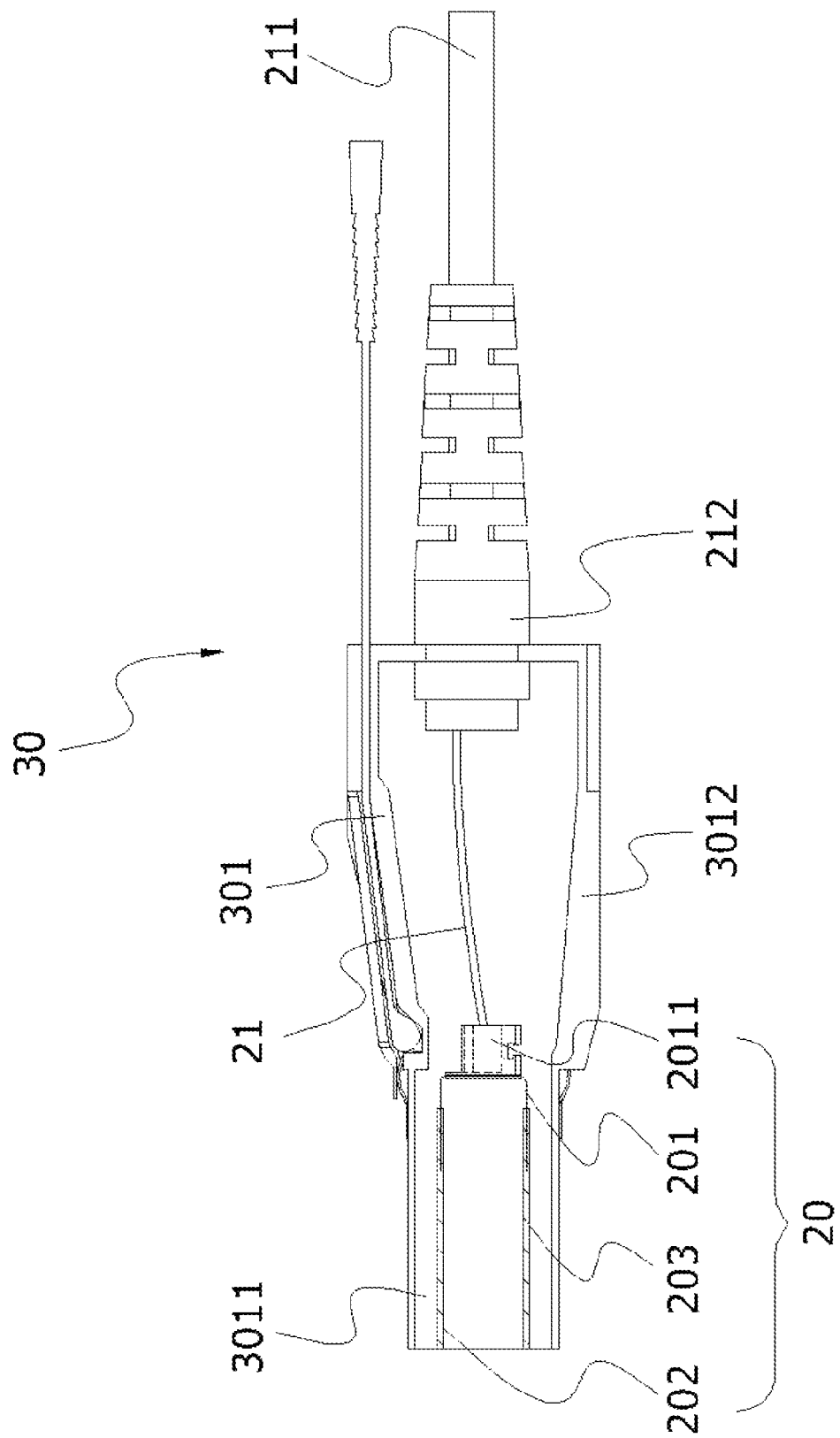
FIG. 4 is a schematic view of the implementation (I) of the present invention.
Figure 5:
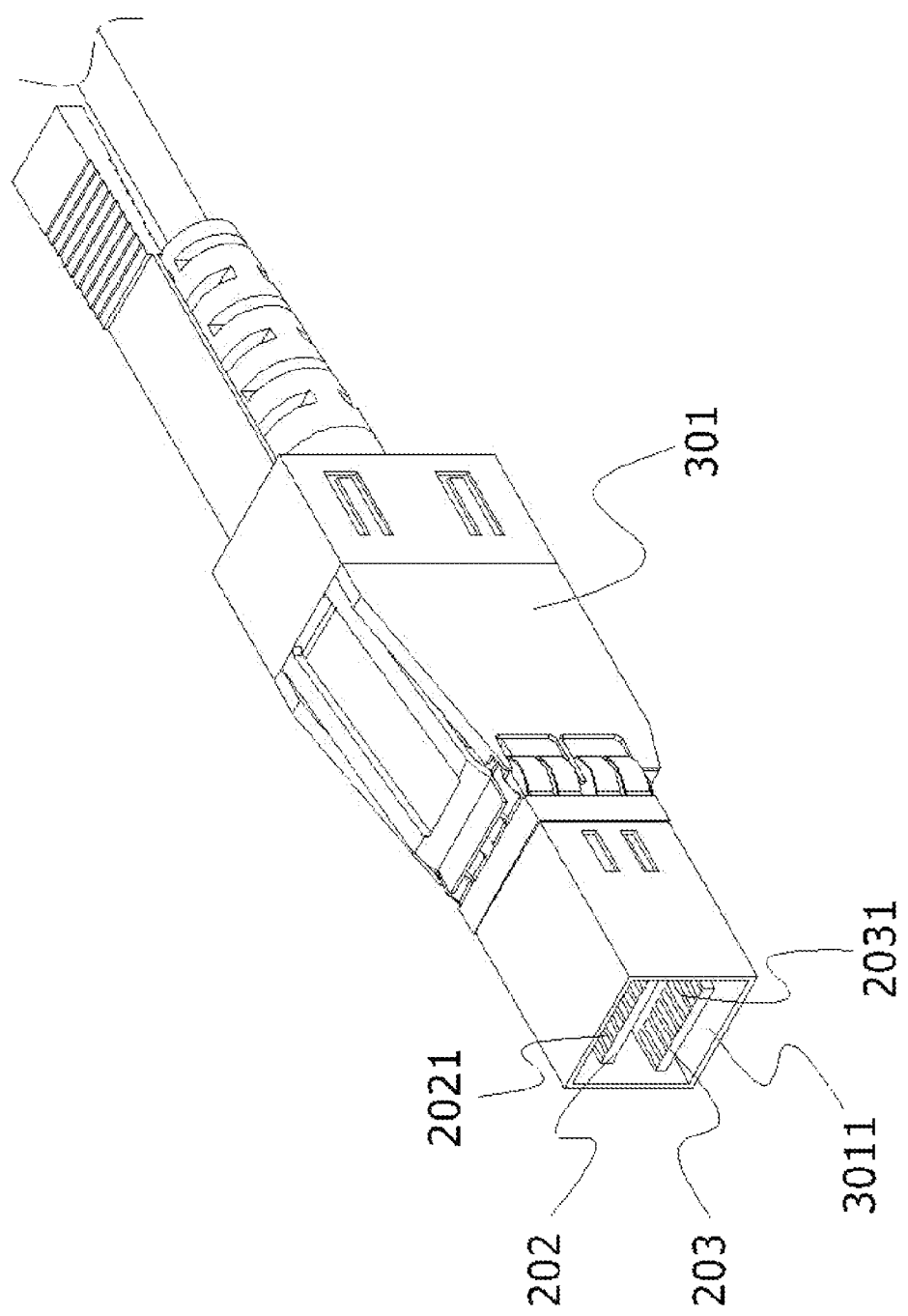
FIG. 5 is a schematic view of the implementation (II) of the present invention.

FIG. 4 is a schematic view of the implementation (I) of the present, invention. As shown in the figure, the optoelectronic transmission module 20 is further assembled in the interior of a connecting joint 301 of the optoelectronic connector 30. The connecting joint 301 completely encapsulates the whole optoelectronic transmission module 20 therein so as to protect concerned units or members associated with the optoelectronic transmission module 20. Furthermore, the second circuit board 202 is disposed correspondingly at the upper side or the lower side of the third circuit board 203, so that the second circuit board 202 and the third circuit board 203 are opposite to each other in normal state. Further, when the second circuit board 202 and the third circuit board 203 are assembled within the connecting joint 301, the first information transmission port 2021 and the second information transmission port 2031 (as shown in FIG. 2) are disposed at an opening end of the connecting joint 301 such that the first information transmission port 2021 and the second information transmission port 2031 can be present as exposed. Moreover, the exterior of the optical fiber line 21 has an outer cladding layer 211, and the outer cladding layer 211 has its end formed with a fixing member 212 for fixing on an assembly end 3012 of the connecting joint 301 so that the optical fiber line 21 can be securely fixed to the connecting joint 301. Thus, the conversion between light signals and the electric signals can be enabled when the connection between the optoelectronic module 2011 and the optical fiber line 21 has been completed. The data received respectively by the two information transmission ports (2021, 2031) of the second circuit board 202 and the third circuit board 203 can be transmitted to the first circuit board 201 by the second and the third circuit boards (202, 203), and then the data received is converted into light signals by the optoelectronic module 2011 of the first circuit board 201 and the light signals is transmitted through the optical fiber line 21. On the contrary, light signals is input and transmitted through the optical fiber line 21 and is converted into electric signals by the optoelectronic module 2011, and then the electric signals is transmitted to both the information transmission ports (2021, 2031) of the second and the third circuit board (202, 203) for further transmission. FIG. 5 is a schematic view of the implementation (II) of the present invention. As shown in the figure, after accomplishment of assembly, the first and the second information transmission ports (2021, 2031) of the second and the third circuit boards (202, 203) are respectively exposed to the opening end 3011 of the connecting joint 301 so that the connecting joint 301 can be inserted into the first and the second information transmission ports (2021, 2031) for data transmission.

Figure 6:
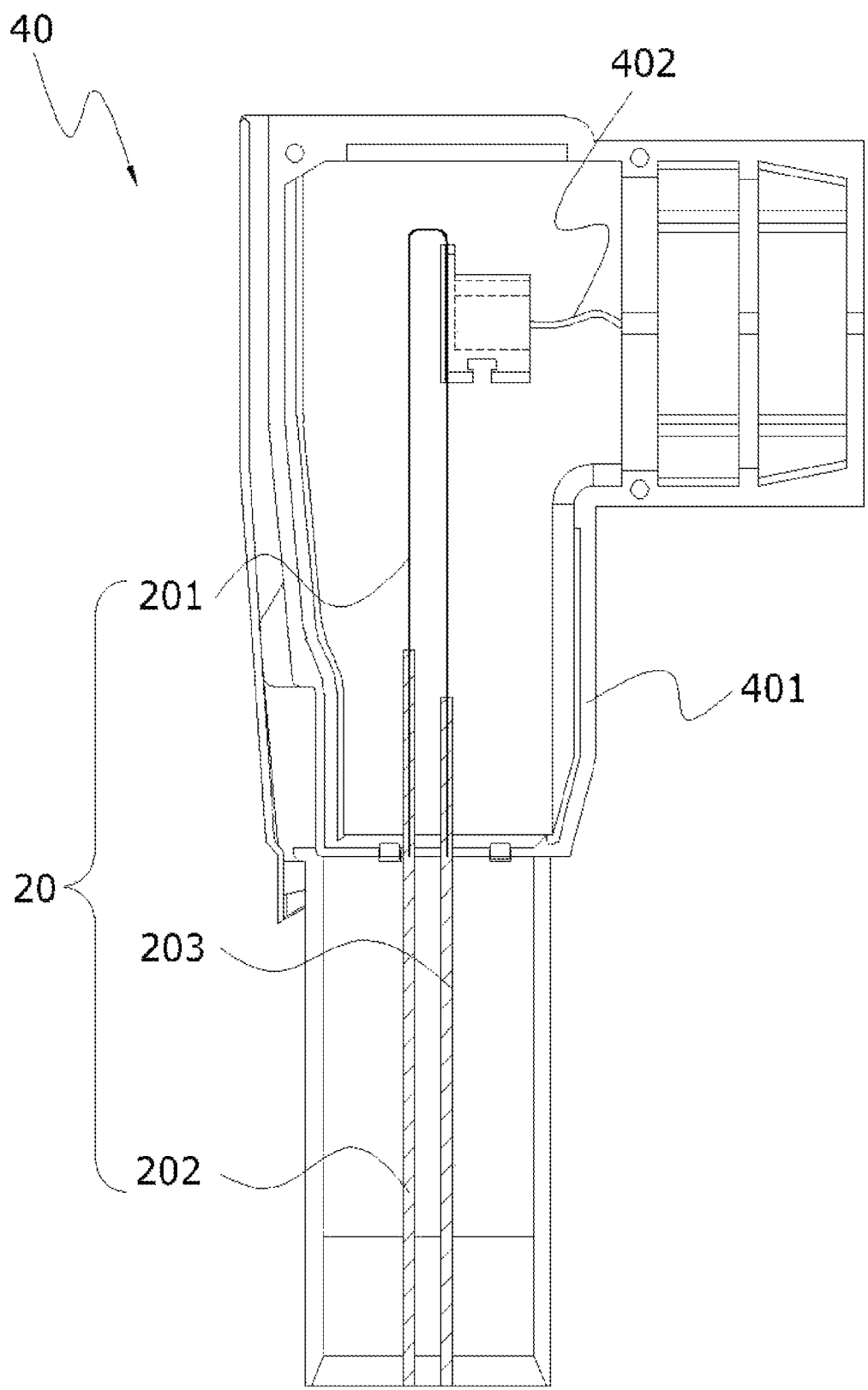
FIG. 6 is another embodiment (I) of the present invention.

FIG. 6 is another embodiment (I) of the present invention. The second and the third circuit boards (202, 203) stated above can be bent appropriately relative to the first circuit board 201, as the first circuit board 201 is a flexible circuit board. By taking advantage of this feature, the optoelectronic transmission module 20 can be assembled within a specially designed optoelectronic connector, such as an optoelectronic connector 40 with substantially L shape appearance shown in the figure, in which the optical fiber 402 and the connecting joint 401 are in perpendicular connection. In the assembly of the optoelectronic transmission module 20, the second circuit board 202 can be further bent appropriately relative to the first circuit board 201 so that the optoelectronic module 2011 of the first circuit board 201 can face directly to the optical fiber line 402 to accomplish the connection. Therefore, the finished product entity of the present invention has the feature for appropriate bending which can facilitate the assembly in a variety of specially designed optoelectronic connector.

Figure 7:
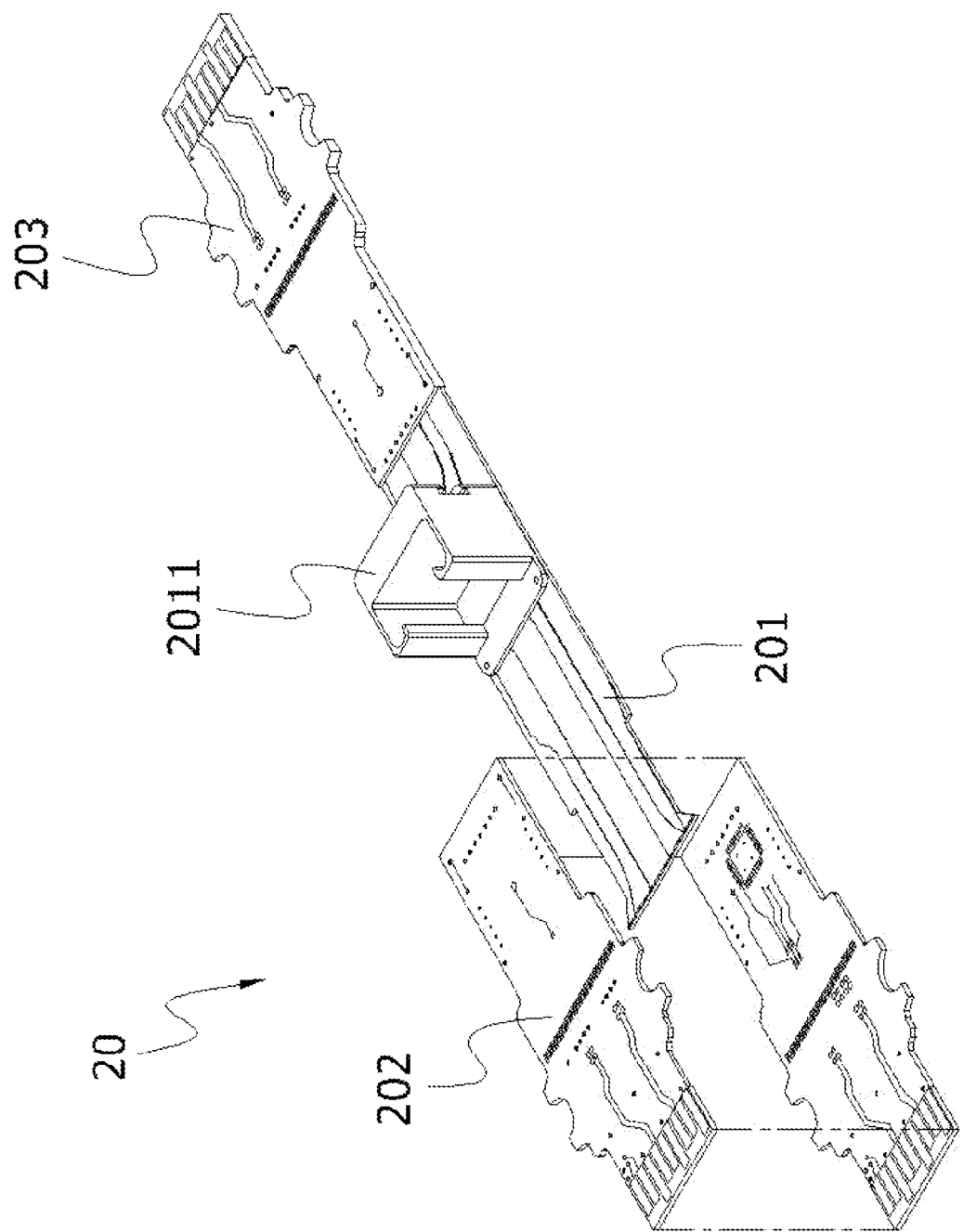
FIG. 7 is still another embodiment (II) of the present invention.

FIG. 7 is still another embodiment (II) of the present invention. The second circuit boards 202 and the third circuit board 203 stated above are electrically connected respectively to both ends of the first circuit board 201. Besides general soldering, the combination method of rigid-flex board can be used to accomplish the electrical connection, so that the second and the third circuit boards (202, 203) can be respectively connected to both ends of the first circuit board 201 by rigid-flex, and the overall of the present invention can be made to be more secure.

Figure 8:
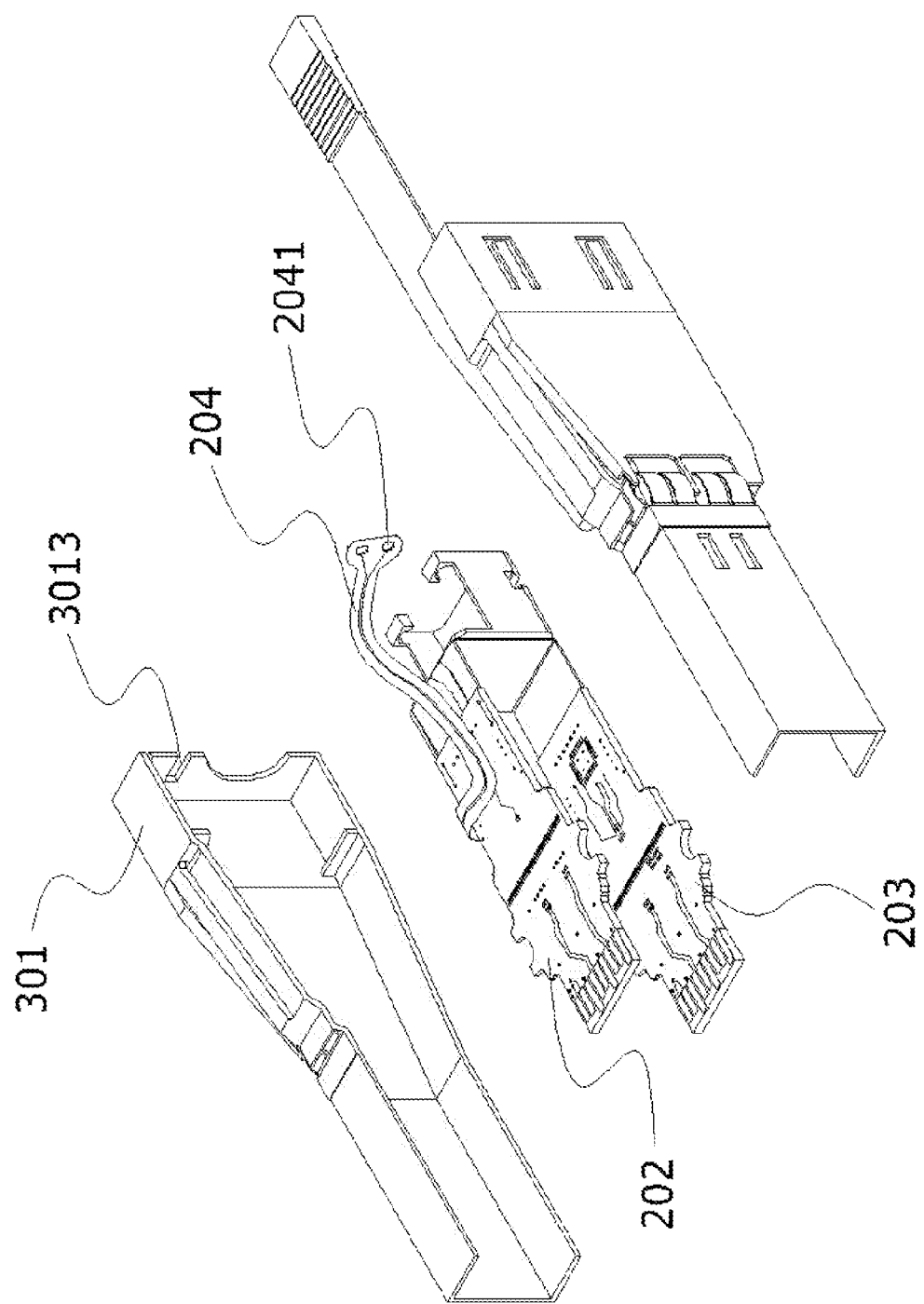
FIG. 8 is yet still another embodiment (III) of the present invention.
Figure 9:
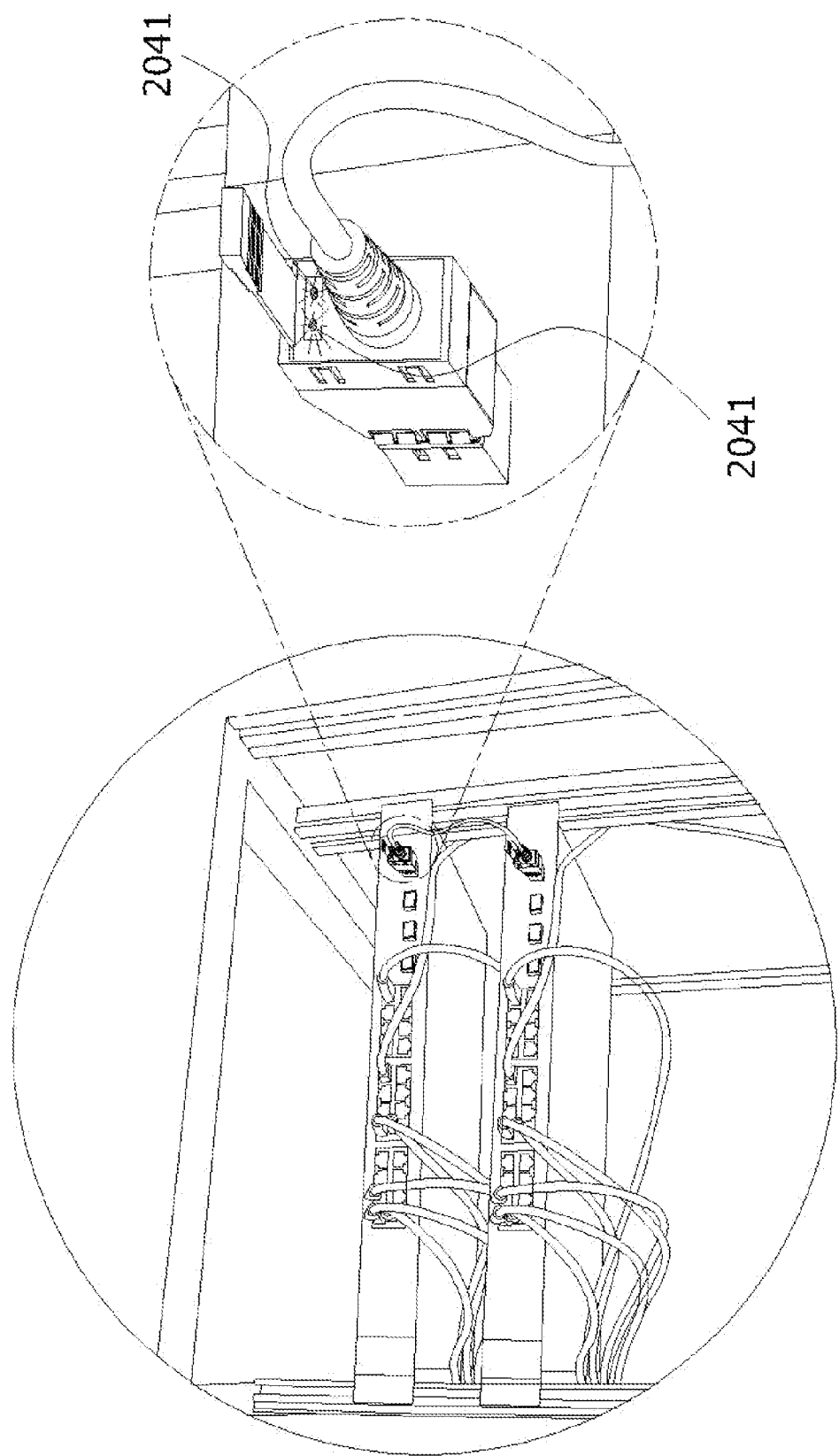
FIG. 9 is a schematic view showing the implementation of the yet another embodiment (III) of the present invention.

FIG. 8 is yet another embodiment (III) of the present invention. In this embodiment, a fourth circuit board 204 is electrically connected to one surface of the second circuit boards 202 and the third circuit board 203, and for the sake of convenience, the second circuit boards 202 is taken as the example in the figure. The fourth circuit board 204 is a flexible printed circuit board having flexibility, and the fourth circuit board 204 has a plurality of LEDs 2041 electrically connected on one end thereof. Further, one end of the connecting joint 301 is formed with a through hole 3013 where the above LEDs 2041 are located therein after assembly. The LEDs 2041 can be driven to emit light when the optoelectronic transmission module of the present invention is connected so as to conduct data transmission. FIG. 9 is a schematic view showing the implementation of the yet another embodiment (III) of the present invention. As stated according to FIG. 8, users can judge the status of actuation by the light emitted from the LEDs 2041, for example; ON state of one LED 2041 indicates the transmission is normal and ON state of two LEDs 2041 indicates the transmission is abnormal etc., so as distinguish the status of the implementation of the present invention.

According to the implementation of the present invention based on foregoing, the conversion between the light signals and the electric signals transmitted by the optical fiber line can be enabled by the optoelectronic module provided on the third circuit board, and the signals thus converted is then transmitted to the two information transmission ports of the first and the second circuit boards so that data transmission can be conducted from both information transmission ports through a single optoelectronic module. In this manner, this invention can conduct bidirectional data transmission by providing an optoelectronic connector using only a single optoelectronic module, so as to reduce the manufacturing cost significantly.

While the present invention has been described by preferred embodiments in conjunction with accompanying drawings, it should be understood the embodiments and the drawings are merely for descriptive and illustrative purpose, not intended for restriction of the scope of the present invention. Equivalent variations and modifications conducted by person skilled in the art without departing from the spirit and scope of the present invention should be considered to be still within the scope of the present invention.

What is claimed is:

1. An optoelectronic transmission module, assembled within an optoelectronic connector, which enables bidirectional data transmission when connected to an optical fiber line, wherein said optoelectronic transmission module comprises:

a flexible first circuit board having flexibility, an optoelectronic connector being assembled on its surface, one end of said first circuit board being electrically connected with one end of a hard second circuit board, the other end of said second circuit board having a first information transmission port, the other end of said first circuit board being electrically connected with one end of a hard third circuit hoard, the other end of said third circuit board having a second information transmission port;

said optoelectronic module of said first circuit board enabling information linking for said optical fiber line, said second circuit board and said third circuit board being able to be assembled within said optoelectronic connector by taking advantage of the feature of said flexibility owned by said first circuit board.

2. The optoelectronic transmission module as claimed in claim 1, wherein said second circuit board and said third circuit board are electrically connected respectively to both ends of said first circuit board by soldering.

3. The optoelectronic transmission module as claimed in claim 1, wherein said second circuit board and said third circuit board are electrically connected respectively to both ends of said first circuit board by the combination method of rigid-flex board.

4. The optoelectronic transmission module as claimed in claim 1, wherein a soft fourth circuit board with flexibility is electrically connected to one surface of said second circuit boards, and said fourth circuit board has a plurality of LEDs electrically connected on one end thereof.

5. The optoelectronic transmission module as claimed in claim 1, wherein a soft fourth circuit board with flexibility is electrically connected to one surface of said third circuit boards, and said fourth circuit board has a plurality of LEDs electrically connected on one end thereof.

6. The optoelectronic transmission module as claimed in claim 1, wherein said optical fiber line is a single-core optical fiber.

7. The optoelectronic transmission module as claimed in claim 1, wherein said optical fiber line is a multi-cores optical fiber.

* * * * *